(12) United States Patent
Xu

(10) Patent No.: US 10,532,508 B2
(45) Date of Patent: Jan. 14, 2020

(54) SEAL RING FOR VENT SADDLE IN EXTRUSION BARREL

(71) Applicant: GRAHAM ENGINEERING CORPORATION, York, PA (US)

(72) Inventor: Jingyi Xu, York, PA (US)

(73) Assignee: Graham Engineering Corporation, York, PA (US)

( * ) Notice: Subject to any disclaimer, the term of this patent is extended or adjusted under 35 U.S.C. 154(b) by 350 days.

(21) Appl. No.: 15/782,537

(22) Filed: Oct. 12, 2017

(65) Prior Publication Data
US 2018/0141259 A1 May 24, 2018

Related U.S. Application Data

(60) Provisional application No. 62/424,017, filed on Nov. 18, 2016.

(51) Int. Cl.
| | |
|---|---|
| *B29C 48/76* | (2019.01) |
| *F16L 55/07* | (2006.01) |
| *B29C 48/68* | (2019.01) |
| *B29C 48/25* | (2019.01) |
| *F16J 15/00* | (2006.01) |
| *F16L 41/08* | (2006.01) |
| *F16J 15/08* | (2006.01) |
| *F16J 15/06* | (2006.01) |

(52) U.S. Cl.
CPC .......... *B29C 48/763* (2019.02); *B29C 48/254* (2019.02); *B29C 48/68* (2019.02); *B29C 48/6803* (2019.02); *F16J 15/00* (2013.01); *F16J 15/062* (2013.01); *F16J 15/0881* (2013.01); *F16J 15/0887* (2013.01); *F16L 41/086* (2013.01); *F16L 55/07* (2013.01)

(58) Field of Classification Search
CPC ... B29C 48/766; B29C 48/767; B29C 48/765; B29C 48/763; B29C 48/254; F16L 13/10–128; F16L 41/02; F16L 41/086
USPC .......................................................... 425/203
See application file for complete search history.

(56) References Cited

U.S. PATENT DOCUMENTS

| | | | | |
|---|---|---|---|---|
| 1,691,609 | A | * 11/1928 | Oskrit | F16L 41/086 285/136.1 |
| 2007/0043177 | A1* | 2/2007 | Michie, Jr. | C08F 210/16 526/65 |

FOREIGN PATENT DOCUMENTS

JP 55105543 A * 8/1980 ......... B29C 45/1753

* cited by examiner

*Primary Examiner* — Robert C Dye
*Assistant Examiner* — Farah Taufiq
(74) *Attorney, Agent, or Firm* — Saxton & Stump LLC

(57) ABSTRACT

A sealing device for sealing a venting port of an extrusion apparatus. The sealing device includes a saddle having a saddle counter bore and a seal ring positioned in the saddle counter bore of the saddle. The sealing device also includes a barrel counter bore provided in a barrel of the extrusion apparatus. The saddle counter bore and the barrel counter bore are dimensioned to receive the seal ring, wherein when the seal ring is positioned in the saddle counter bore and the barrel counter bore, a seal is formed between the seal ring in all range of processing temperatures, the saddle and the barrel to prevent the unwanted leakage of high pressure melt.

20 Claims, 5 Drawing Sheets

SEAL RING FOR VENT SADDLE IN EXTRUSION BARREL

FIELD OF THE INVENTION

The invention is directed to a device and method for sealing a vent saddle in an extrusion barrel. In particular, the invention is directed to a seal ring which cooperates with the vent saddle to prevent melt leakage and mechanical failure.

BACKGROUND OF THE INVENTION

Vents are designed to release air, moisture and other volatile gases following the initial melting of polymers. The velocity of air and/or vapors flowing out of these vent-port openings is a function of volume flow rate and the vent open area. The venting screw inside barrel has a decompression zone in the venting position so the melt pressure is almost zero in the venting port. However, there is a solid plug designed to replace the venting valve. In single stage screws, this plug closes the venting port without the decompression zone. In other words, the venting port will have full melt pressure from single stage screw that may reach to 10,000 psi. In known vent closes, the high pressure melt may flow between the vent plug and a saddle provided around the opening, causing melt leakage to occur between the vent opening and the saddle or causing the mechanical failure of the saddle because of high forces from hydraulic pressure.

In order to minimize leakage, in know applications, the saddle may be welded to the barrel with bimetallic liner. This is a difficult and time consuming process to control minimum residual stress and distortion from welding.

It would therefore be beneficial to provide a vent opening for an extrusion barrel in which the saddle has a seal ring which can be safely used as a venting valve for a two-stage screw and a venting plug for a single-stage screw.

SUMMARY OF THE INVENTION

An object is to provide a soft metal seal ring with different thermal expansion than the extrusion barrel and the saddle to prevent both melt leaking and mechanical part failure under high melt pressure in a venting barrel.

An object is to provide a seal ring that can be used with the saddle that will simplify the manufacturing and provide better cost and delivery, the barrel being counter bored to receive the seal ring therein.

An object is to provide a seal at the inside diameter of the vent plug so that the pressurized melt will not leak into the area under the saddle.

An embodiment is directed to a sealing system for sealing a venting port of an extrusion apparatus. The sealing system includes a saddle having a saddle counter bore and a seal ring positioned in the saddle counter bore of the saddle. The sealing system also includes a barrel counter bore provided in a barrel of the extrusion apparatus. The saddle counter bore and the barrel counter bore are dimensioned to receive the seal ring, wherein when the seal ring is positioned in the saddle counter bore and the barrel counter bore, a seal is formed between the seal ring, the saddle and the barrel to prevent the unwanted leakage of high pressure melt.

An embodiment is directed to an extrusion barrel. The extrusion barrel has a wall with a rounded outer surface. A venting port extends through the wall of the barrel, with the venting port having a venting port diameter. A barrel counter bore extends into the wall about a circumference of the venting port. Barrel mounting openings are provided about the periphery of the barrel counter bore. A saddle has a saddle inside surface, a saddle outside surface, a saddle upper surface and a saddle lower surface. An inside diameter of the saddle is equal to or approximately equal to the diameter of the venting port. The saddle lower surface has an arcuate configuration to allow the saddle lower surface to rest on the rounded outer surface of the barrel. Saddle mounting openings extend from the saddle upper surface through the saddle lower surface. The saddle mounting openings align with the barrel mounting openings. A saddle counter bore extends into the saddle inside surface proximate the saddle lower surface. A generally cylindrical seal ring is housed in the barrel counter bore and the saddle counter bore. The seal ring has a seal ring inside surface, a seal ring outside surface, a seal ring upper surface and a seal ring lower surface. An inside diameter of the seal ring is equal to or approximately equal to the diameter of the venting port. Chamfers are provided in the seal ring outside surface proximate both the seal ring upper surface and the seal ring lower surface. The chamfers allow for compression deformation and thermal expansion of the seal ring relative to the barrel and the saddle.

An embodiment is directed to a sealing device for use with an extrusion barrel having a venting port. The sealing device includes a saddle having a saddle inside surface, a saddle outside surface, a saddle upper surface and a saddle lower surface. The saddle lower surface has an arcuate configuration to allow the saddle lower surface to rest on a rounded outer surface of the barrel. Saddle mounting openings extend from the saddle upper surface through the saddle lower surface. The saddle mounting openings align with barrel mounting openings of the extrusion barrel. A saddle counter bore extends into the saddle inside surface proximate the saddle lower surface. A generally cylindrical seal ring is housed in the saddle counter bore and configured to cooperate with a barrel counter bore of the extrusion barrel. The seal ring has a seal ring inside surface, a seal ring outside surface, a seal ring upper surface and a seal ring lower surface. An inside diameter of the seal ring is equal to or approximately equal to an inside diameter of the saddle. Chamfers are provided in the seal ring outside surface proximate both the seal ring upper surface and the seal ring lower surface. The chamfers allow for compression deformation and thermal expansion of the seal ring relative to the saddle.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The present invention will be described more fully hereinafter with reference to the accompanying drawings, in which illustrative embodiments of the invention are shown.

DETAILED DESCRIPTION OF THE INVENTION

Figure 1:
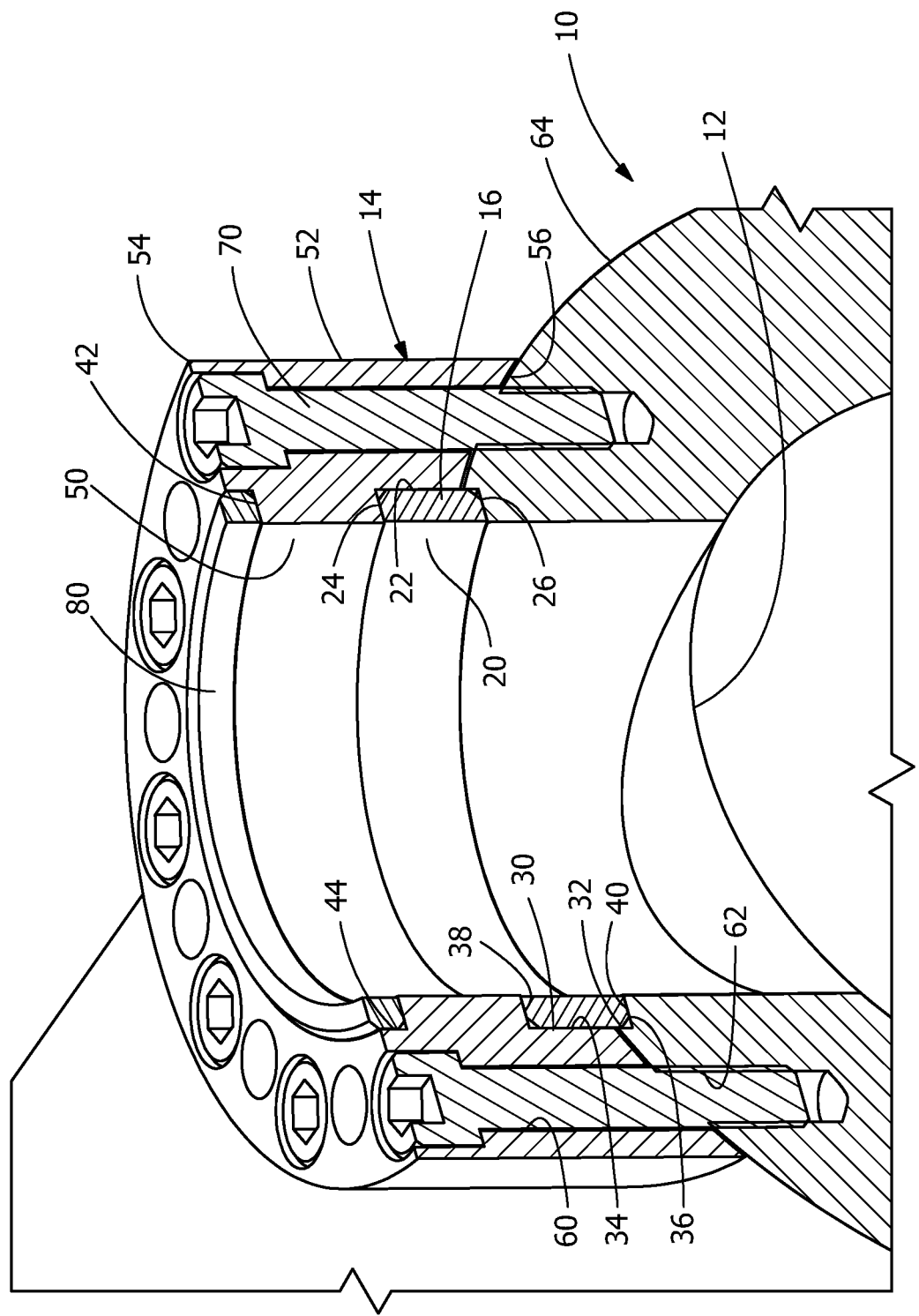
FIG. 1 is a perspective cross-sectional view of an illustrative embodiment of a saddle and seal ring mounted to a barrel of an extrusion device.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

Referring to FIG. 1, an extrusion barrel 10 is shown having a venting opening or port 12, a saddle 14 and a seal ring 16.

Figure 5:
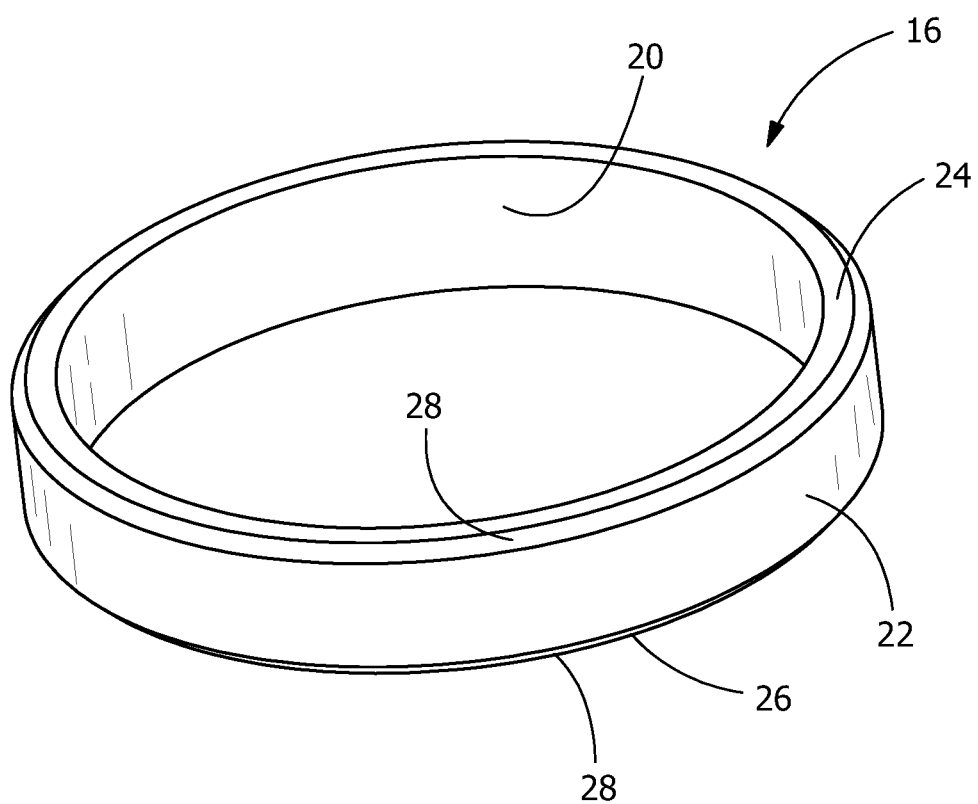
FIG. 5 is a perspective view of the seal ring of FIG. 1.

The seal ring 16, as best shown in FIG. 5, is made of soft metal, such as, but not limited to, stainless steel (304 or 316) or copper. The seal ring 16 has a generally cylindrical configuration with an inside surface 20, an outside surface 22, an upper surface 24 and a lower surface 26. Chamfers 28 are provided in the outside surface 22 proximate both the upper surface 24 and the lower surface 26. The chamfers 28 allow for compression deformation and thermal expansion of the seal ring 16 relative to the barrel 10 and the saddle 14.

Figure 2:
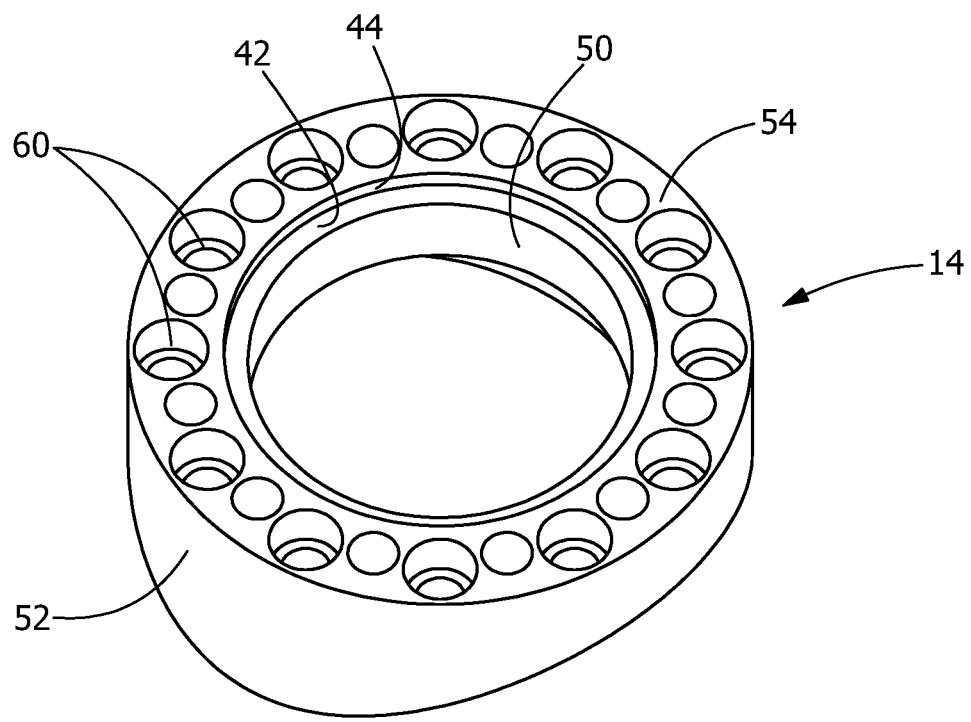
FIG. 2 is a top perspective view of the saddle of FIG. 1.
Figure 3:
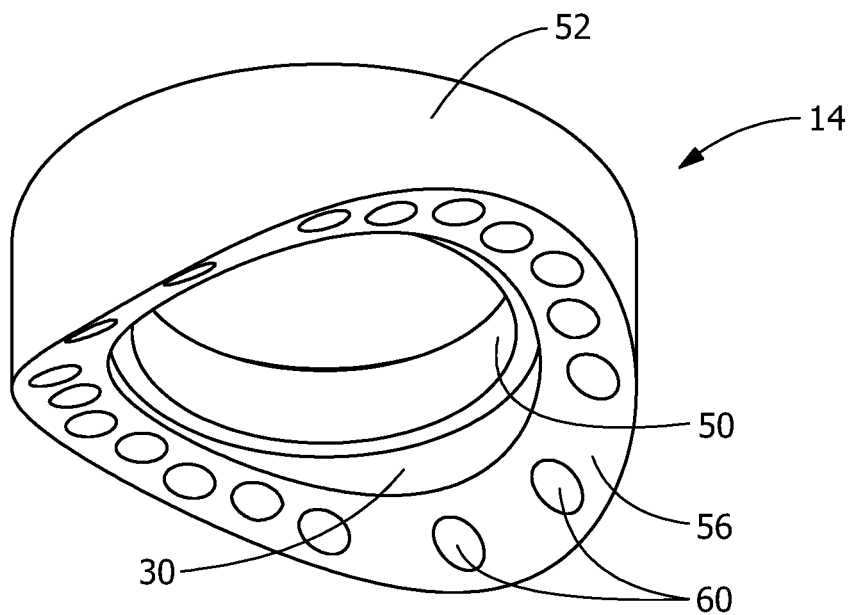
FIG. 3 is a bottom perspective view of the saddle of FIG. 1.
Figure 4:
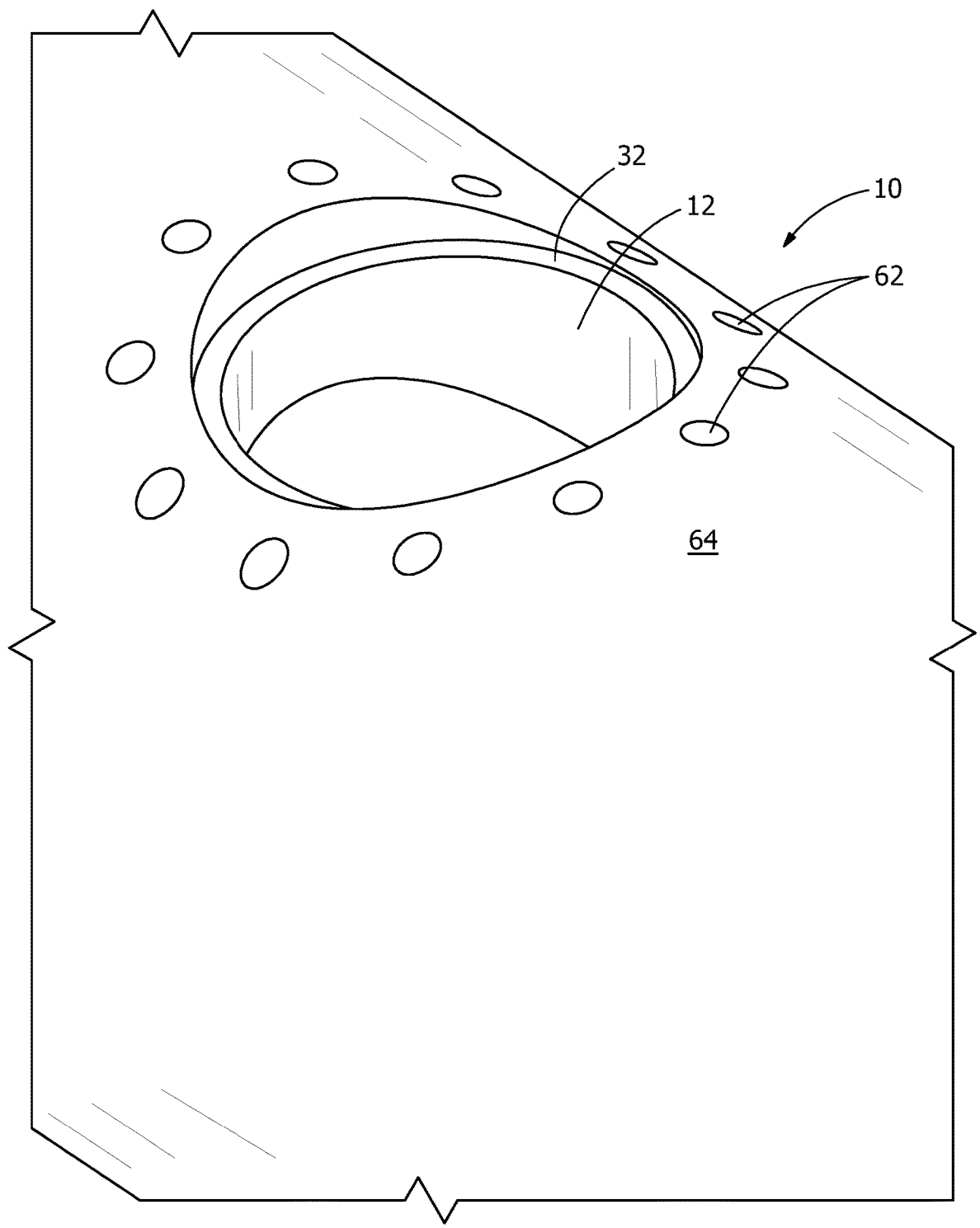
FIG. 4 is a perspective view of the barrel with the venting port provided therein.

As best shown in FIGS. 2 and 3, the saddle 14 has a generally cylindrical configuration with an inside surface 50, an outside surface 52, an upper surface 54 and a lower surface 56. The lower surface 56 is configured to have an arcuate configuration to allow the lower surface 56 to rest on the rounded outer surface 64 (FIGS. 1 and 4) of the barrel 10. Mounting openings 60 extend from the upper surface 50 through the saddle 14 and through the lower surface 56. As shown in FIG. 1, the mounting openings 60 align with mounting openings 62 which extend through the outer surface 64 of the barrel 10. Mounting members 70, such as, but not limited to, screws or studs, extend through the mounting openings 60, 62 to secure the saddle 14 to the barrel 10.

Figure 6:
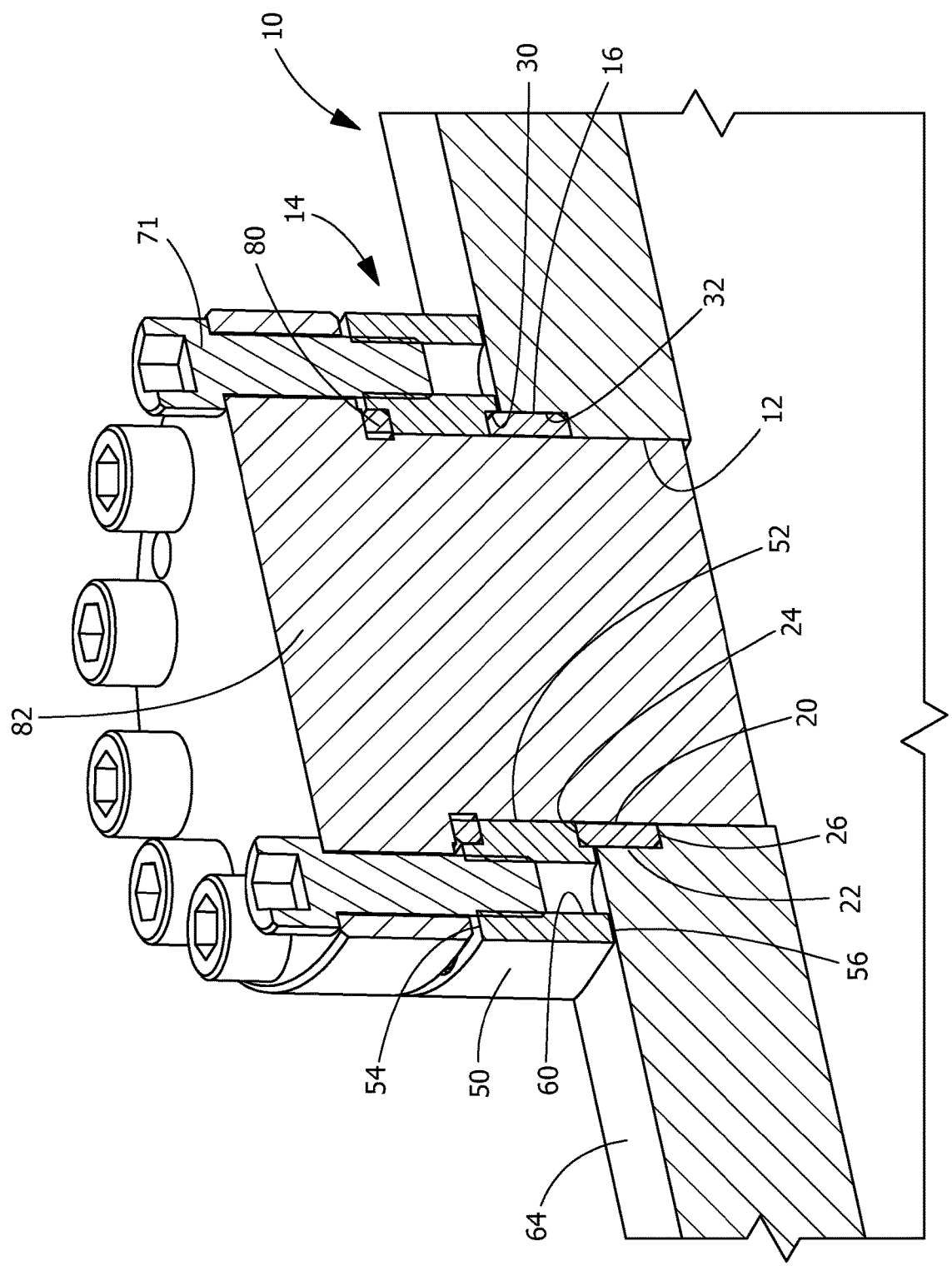
FIG. 6 a perspective cross-sectional view of an illustrative embodiment of the assembly of FIG. 1 with a plug positioned in venting port of barrel.

As best shown in FIG. 3, a counter bore 30 is cut in the saddle 14. The counter bore 30 is provided in the inside surface 50 of the saddle 14 proximate the lower surface 56. A counter bore 32 (FIG. 4) is also cut into the barrel 10 about the periphery of the venting port 12. The counter bores 30, 32 are dimensioned to receive the seal ring 16 therein, as shown in FIGS. 1 and 6. The counter bores 30, 32 and seal ring 16 are dimensioned such that when the seal ring 16 is positioned in the counter bores 30, 32, a seal is formed between the seal ring 16 and the saddle 14 and barrel 10 to prevent the unwanted leakage of high pressure melt. As shown in FIG. 1, the counter bore 30 provides an accurately controlled and manufactured machined seal surface 34 in the saddle 14. The counter bore 32 provides an accurately controlled and manufactured machined seal surface 36 in the venting port 12 of the barrel 10. The seal surfaces 34, 36 are parallel and flat to provide the required sealing surfaces between the outside surface 22 of the seal ring 16 and seal surfaces 34, 36.

In one illustrative embodiment, for a 6 inch barrel 10, the seal ring 16 may have a 4 inch inside diameter of the inside surface 20 and a 4.5 inch outside diameter of the outside surface 22. The bore depth of counter bores 30, 32 will be 0.5 inches to the seal surfaces 34, 36 to provide a flat seal surface 34, 36 across both the saddle 14 and barrel 10. The counter bores 30, 32 are dimensioned to provide sufficient support to the seal ring 16 such that the seal ring 16 has enough strength without buckling and provides proper contact stress from compression for about 0.2% yielding. In the illustrative embodiment, the saddle 14 is made from the same or similar material as the barrel 10 base metal. An example of such a material is 4140 pre-heat treated steel. However, the saddle 14 and barrel 10 may be made from different materials without departing from the scope of the invention.

In the illustrative embodiment shown, the 0.2% of yielding strength of stainless steel seal ring 16 is about 31,200 psi. The contact stress of the seal ring 16, made from 304 steel, created by all twelve of the mounting members or ½ inch screws is larger than the yielding stress of the steel, causing the yielding stress of the seal ring 16 to be reached. This will provide good sealing at room temperature. Additionally, when the barrel 10 is heated up to processing temperature, the seal ring 16 will expand more than the saddle 14 and mounting member 70 since the coefficient of thermal expansion for the seal ring is about 18% higher than the 4140 steel. As the expansion of the seal ring 16 is greater than the expansion of the saddle 14, the seal between the seal ring 16 and the saddle 14 and the barrel 10 will be maintained and/or enhanced.

Sufficient mounting members 70 are provided to mount and maintain the saddle 14 against the seal ring 16 and barrel 10. The height of the seal ring 16 is controlled to ensure that the seal ring 16 contacts tightly with the surface 38 (FIG. 1) of counter bore 30 and the surface 40 of counter bore 32. In the illustrative embodiment shown, the mounting members 70 are tightened with proper torque to create sufficient force to create the compression deformation of the seal ring 16 previously described. In one illustrative embodiment, twelve mounting members 70 are provided, the mounting members 70 being grade 8 screws. The screws are torqued to 60% to 65% of yielding stress of the screw (about 80,600 psi), causing all screws to be in compression stress even when the melt pressure in the barrel reaches 10,000 psi. This allows a safe seal to be provided even when the venting plug is used for a single stage screw.

As best shown in FIG. 1, a second seal ring 80 cooperates with a counter bore 42 provided in the inside surface 50 of the saddle 14 proximate the upper surface 54. The second seal ring 80 has similar properties to the seal ring 16. However, the dimensions of the second seal ring 80 may be different to the dimensions of the seal ring 16. The counter bore 42 is dimensioned to receive the second seal ring 80 therein. The counter bore 42 provides an accurately controlled and manufactured machined seal surface 44 in the saddle 14. The second seal ring 80 cooperates with a venting plug 82, as shown in FIG. 6. The counter bore 42 and second seal ring 80 are dimensioned such that when the second seal ring 80 is positioned in the counter bore 42, a seal is formed between the second seal ring 80, the saddle 14 and the venting plug 82 to prevent the unwanted leakage of high pressure melt.

As shown in FIG. 6, the plug 82 is installed in the venting port of barrel and bolted on by the mounting members 71. This view shows the original positions of all components without compression so that there are significant gaps among the saddle, barrel, and plug. The gaps allow the seal ring 80 to properly deform as the mounting members 71 are tightened.

All mounting members 70, 71 will be tightened or torqued with sufficient force to prevent failure when melt pressure is applied on the plug surface and to allow enough deformation on the top and bottom seal rings to seal the surfaces among plug, barrel and saddle.

The use of saddles with seal rings has various advantages over prior art saddles which required welding. For example, the use of the seal ring simplifies the manufacturing and provides better cost and delivery time over the known art. Welding the saddle in the barrel with bimetallic liner, as required by the known art, is more difficult than machining the counter bore and threaded holes in barrel, as required by the present invention.

The use of the seal ring of the present invention seals the inside diameter of the venting plug so that the pressurized melt will not leak into the large area under the saddle. The leakage into the area under the saddle on previous known designs increases the pressure area from 4 inches to 6.5 inches causing the force on the saddle to increase from 125,600 lbs to 331,662 lbs, resulting in the failure of various saddles which were welded to the barrel.

The smaller pressure area of the present invention requires less holding force from the mounting members or screws so that the screw sizes can be reduced from ⅝ inch to ½ inch. The depth of the thread hole in the barrel of the present invention is also reduced from the known art, thereby allowing the present invention to be used for all sizes of venting barrels.

The stainless steel seal ring of the present invention may be used when extruding different plastics, including plastics with additives that may have a chemical reaction to other metals, such as copper, etc. In addition, the soft seal ring will not inflict any damage on the barrel if the screws are over torqued.

The saddle 14 and seal ring 16 are configured to a similar size to existing vent plugs and vent valves, thereby allowing the saddle 14 and seal ring 16 to use existing mounting opening 62 and the like.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An extrusion barrel comprising:
   a wall having a rounded outer surface, a venting port extending through the wall of the barrel, the venting port having a venting port diameter, a barrel counter bore extending into the wall about a circumference of the venting port, barrel mounting openings provided about the periphery of the barrel counter bore;
   a saddle having a saddle inside surface, a saddle outside surface, a saddle upper surface and a saddle lower surface, an inside diameter of the saddle equal to or approximately equal to the diameter of the venting port, the saddle lower surface having an arcuate configuration to allow the saddle lower surface to rest on the rounded outer surface of the barrel, saddle mounting openings extending from the saddle upper surface through the saddle lower surface, the saddle mounting openings align with the barrel mounting openings, a saddle counter bore extending into the saddle inside surface proximate the saddle lower surface;
   a generally cylindrical seal ring housed in the barrel counter bore and the saddle counter bore, the seal ring having a seal ring inside surface, a seal ring outside surface, a seal ring upper surface and a seal ring lower surface, an inside diameter of the seal ring equal to or approximately equal to the diameter of the venting port, chamfers provided in the seal ring outside surface proximate both the seal ring upper surface and the seal ring lower surface, the chamfers allow for compression deformation and thermal expansion of the seal ring relative to the barrel and the saddle.

2. The extrusion barrel as recited in claim 1, wherein the seal ring is a soft metal seal ring having a different thermal expansion than the wall of the extrusion barrel and the saddle, wherein the cooperation of the seal ring with the wall of the extrusion barrel and the saddle prevents melt leakage and mechanical part failure under high melt pressure.

3. The extrusion barrel as recited in claim 2, wherein in the seal ring is made of stainless steel or copper.

4. The extrusion barrel as recited in claim 2, wherein the barrel counter bore and the saddle counter bore are dimensioned to provide contact stress from compression for about 0.2% yielding, whereby the seal ring does not buckle.

5. The extrusion barrel as recited in claim 1, wherein mounting members extend through the saddle mounting openings into the barrel mounting openings to secure the saddle the wall of the barrel.

6. The extrusion barrel as recited in claim 5, wherein as the barrel is heated, the seal ring will expand more than the saddle and the mounting members as the coefficient of thermal expansion for the seal ring is greater than the coefficient of thermal expansion for the saddle and the mounting members.

7. The extrusion barrel as recited in claim 1, wherein the saddle counter bore provides an accurately controlled saddle seal surface in the saddle, the barrel counter bore provides an accurately controlled barrel seal surface in the wall of the barrel, the saddle seal surface and the barrel seal surface are parallel and flat for to and cooperate with the seal ring to provide the required sealing.

8. The extrusion barrel as recited in claim 1, wherein the saddle and the barrel are made from the base metal.

9. The extrusion barrel as recited in claim 1, wherein the saddle has a second saddle counter bore which extends into the saddle inside surface proximate the saddle upper surface.

10. The extrusion barrel as recited in claim 9, wherein a second seal ring cooperates with the second saddle counter bore.

11. The extrusion barrel as recited in claim 10, wherein the second saddle counter bore provides an accurately controlled second saddle seal surface in the saddle which cooperates with the second seal ring.

12. The extrusion barrel as recited in claim 11, wherein the second seal ring cooperates with a venting plug, wherein a seal is formed between the second seal ring, the saddle and the venting plug to prevent the unwanted leakage of high pressure melt.

13. The extrusion barrel as recited in claim 12, wherein the second seal ring is a soft metal seal ring having a different thermal expansion than the saddle and the venting plug.

14. The extrusion barrel as recited in claim 13, wherein in the seal ring is made of stainless steel or copper.

15. The extrusion barrel as recited in claim 13, wherein the venting plug is mounted to the saddle by second mounting members, the second mounting members extend into second mounting openings of the saddle.

16. A sealing device for use with an extrusion barrel having a venting port, the sealing device comprising:
a saddle having a saddle inside surface, a saddle outside surface, a saddle upper surface and a saddle lower surface, the saddle lower surface having an arcuate configuration to allow the saddle lower surface to rest on a rounded outer surface of the barrel, saddle mounting openings extending from the saddle upper surface through the saddle lower surface, the saddle mounting openings align with barrel mounting openings of the extrusion barrel, a saddle counter bore extending into the saddle inside surface proximate the saddle lower surface;
a generally cylindrical seal ring housed in the saddle counter bore and configured to cooperate with a barrel counter bore of the extrusion barrel, the seal ring having a seal ring inside surface, a seal ring outside surface, a seal ring upper surface and a seal ring lower surface, an inside diameter of the seal ring is equal to or approximately equal to an inside diameter of the saddle, chamfers provided in the seal ring outside surface proximate both the seal ring upper surface and the seal ring lower surface, the chamfers allow for compression deformation and thermal expansion of the seal ring relative to the saddle.

17. The sealing device as recited in claim 16, wherein the saddle has a second saddle counter bore which extends into the saddle inside surface proximate the saddle upper surface.

18. The sealing device as recited in claim 17, wherein a second seal ring cooperates with the second saddle counter bore.

19. The sealing device as recited in claim 18, wherein the seal ring and the second seal ring are soft metal seal rings having a different thermal expansion than the saddle.

20. The sealing device as recited in claim 19, wherein in the seal ring and the second seal ring are made of stainless steel or copper.

* * * * *